United States Patent [19]

Fujiwara

[11] Patent Number: 5,001,955

[45] Date of Patent: Mar. 26, 1991

[54] PAPER-CUTTER

[75] Inventor: Toshio Fujiwara, Kashiwa, Japan

[73] Assignee: Sumitsu & Company, Limited, Japan

[21] Appl. No.: 508,824

[22] Filed: Apr. 13, 1990

[51] Int. Cl.[5] .......................... B23D 19/02; B26D 1/18; B26D 5/08

[52] U.S. Cl. .......................................... 83/488; 83/489; 83/578; 83/614; 83/631

[58] Field of Search ................. 83/578, 614, 485, 487, 83/488, 489, 631, 629, 471, 471.2, 483, 491

[56] References Cited

U.S. PATENT DOCUMENTS

| | | | |
|---|---|---|---|
| 1,147,458 | 7/1915 | Steely | 83/487 |
| 1,645,924 | 10/1927 | Palmigiano, Jr. | 83/488 X |
| 2,846,005 | 8/1958 | Wilson | 83/488 X |
| 4,340,441 | 7/1982 | Thwaites et al. | 83/488 X |
| 4,843,497 | 6/1989 | Leydon | 446/301 X |
| 4,864,906 | 9/1989 | Hall | 83/487 X |

*Primary Examiner*—Frank T. Yost

*Assistant Examiner*—Kenneth E. Peterson

*Attorney, Agent, or Firm*—Wall and Roehrig

[57] ABSTRACT

A movement and rotational movement of the movable blade of the paper-cutter of this invention is constructed with a mechanically engaging mechanism such as a screw mechanism or a pinion/rack mechanism, so that there are no technical problems found with the conventional type of the paper-cutters such as slackening and/or cutting-off of the wire and coming-off of the wire from the drum. Moreover, since it is not necessary for an additional means for providing tension force on the wire, a longer-term stable cutting operation can be achieved. Furthermore, since the fluctuation in the manufacturing accuracy and deformation caused during the production process of the screw grooves as well as case body itself can be controlled and minimized by the screw mechanisms to some extent, the strict requirements for components accuracy can be reduced, resulting in an effective cost-down.

6 Claims, 2 Drawing Sheets

PAPER-CUTTER

BACKGROUND OF THE INVENTION

This invention relates to a paper-cutter having a stationary blade and a movable blade which can be favorably used in a facsimile, a copying machine or the like.

With a conventional type of paper-cutters, a sheet of a paper is cut by moving a movable blade downwardly with respect to the stationary blade. There are several different types of paper-cutters, depending on shapes and moving mechanisms of the movable blade. Namely, there are a rotationable type or a guillotine type.

Among the conventional types of paper-cutters, a rotation/moving method may be the most popular one by which, with forming a movable blade as a circular blade, the movable blade is transferred along a distal edge of a stationary blade while said movable blade being rotated and advanced forwardly. According to a structure of this type of paper-cutters, a distal end of a wire, whose proximal end is connected to the rotationable blade, is wound around a drum and a rotational movement of a rotationable blade is achieved by rotating the drum.

During operating said wire-driven type paper-cutter, the drum may idle and a smooth operation can not be maintained if the wire is slackened. Therefore, a certain magnitude of tension force is needed to be applied to the wire through a spring means in order to prevent the idling. However, there are some problems in reliabilities associated to this type of paper-cutters during a long-term usage, such as an idling of the drum, coming-off of the wire from the drum, or cutting of the wire. These problems are due to an aging-deterioration of a stretched portion of the wire.

OBJECTS AND SUMMARY OF THE INVENTION

It is, therefore, an object of this invention to overcome aforementioned problems found in a conventional type of the paper-cutter having a rotational/movable blade, and to provide a paper-cutter with a higher reliability and a longer durability.

In a paper-cutter having a stationary blade and a rotational/movable blade, a moving mechanism of the movable blade is formed as a single thread screw mechanism or a multiple thread screw mechanism being consisted of male- and female-screws. With the single thread or multiple thread screw mechanism, a moving element, which is female-screwed and a movable blade is mounted thereon, can be moved reciprocally along the male-screw bar by rotating it. At the same time, the movable blade is rotated by engaging a pinion mounted on the rotatable blade to a rack mounted on the moving element.

According to a paper-cutter of this invention, having a structure mentioned above, a movement and a rotation of the movable blade are performed through a mechanical engagement such as a screw mechanism or a pinion-rack machanism, so that there should be no technical drawbacks found in the conventional type such as slackening or cutting of the wire. Moreover, since an additional mechanism for generating a tension force on the wire is not required, this paper-cutter is not subject to any stressing, except a slight stress generated at the initiation of the operation. Hence, the paper-cutter can be utilized for cutting papers precisely with a higher reliability for a long-term usage.

Furthermore, any fluctuation in manufacturing accuracy and deformation caused by a production process for screws and cutter machine itself can be controlled and minimized by a rotational speed of a male-screw by employing the screw-driven mechanism, so that the present invention is economically advantageous because a strict specifications for the final accuracy of the main body as well as components will be relaxed to allow a substantial reduction of manufacturing cost.

DETAILED DESCRIPTION OF THE PREFERRED EMBODIMENTS

Figure 1:
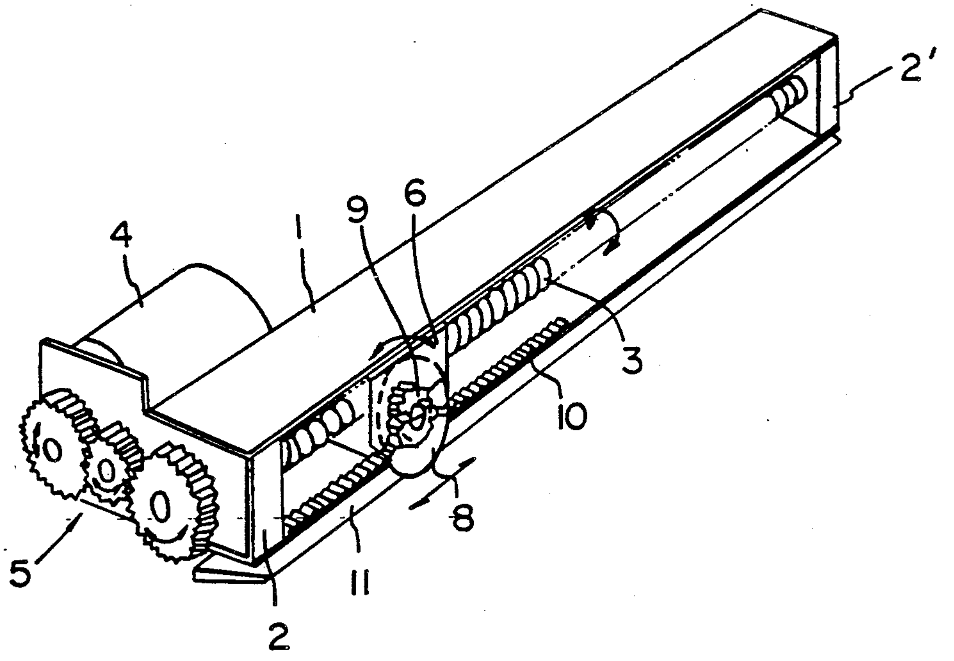
FIG. 1 is a perspective view of the paper-cutter according to this invention and FIG. 2 is a perspective view showing composing members of the paper cutter, as disassembled, of the present invention.
Figure 2:
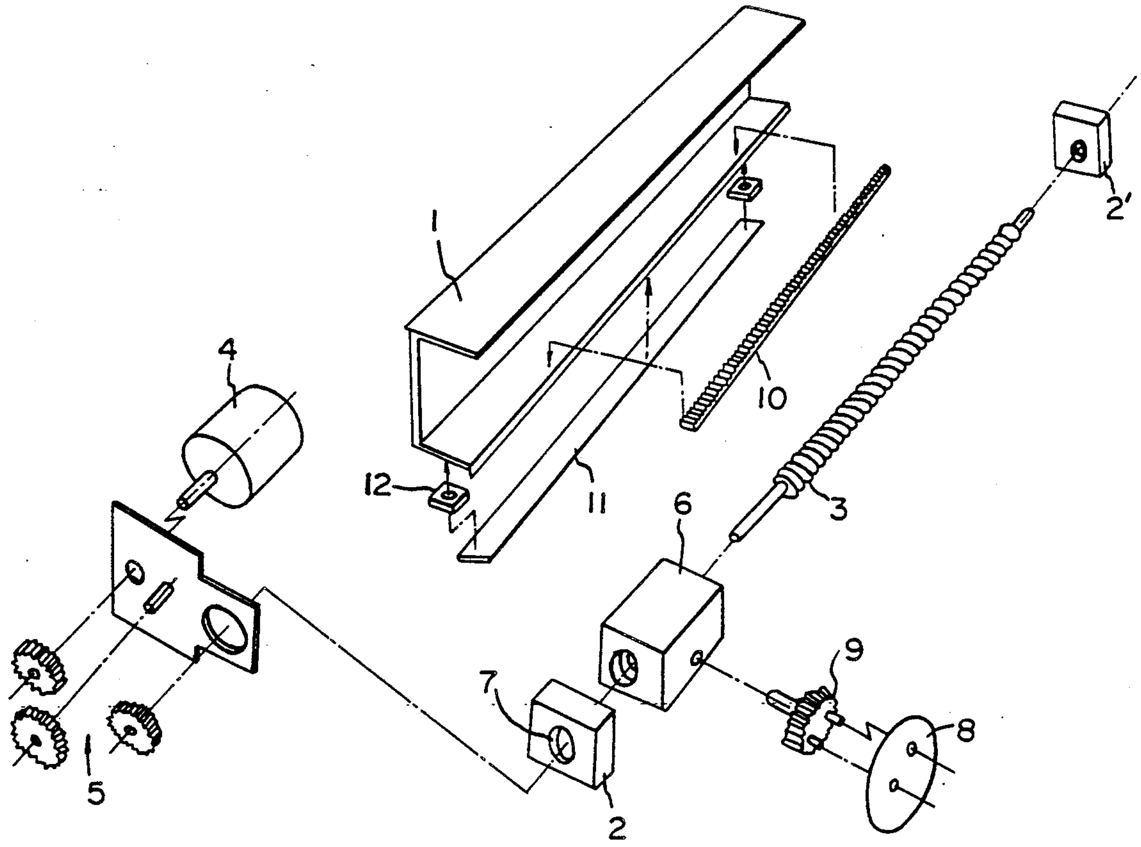

Referring to FIGS. 1 and 2, 1 is a longitudinal metallic case whose cross section has a rectangular C-shape with missing one side. At both ends of the case 1, supporting end plates 2 and 2' are mounted. A male-screw bar 3 made from a synthetic material is provided along the longitudinal direction of the case 1. Both ends of the male-screw bar are fixed to the supporting end plates 2,2' after being passed therethrough. The male-screw bar is constructed in such a way that it can be rotated by a motor mounted on a rear side of the case 1 through a group of gears 5.

A box-shaped moving element 6 is in contact with an inner side of the case 1 and is constructed to slide freely along the longitudinal direction within the case. A female-screw hole 7 through which the male-screw can pass and a circular-shaped rotatable blade 8 are mounted on said moving element 6. The moving element 6 is constructed to travel freely along the longitudinal direction within the case 1 by rotating the male-screw bar 3.

A pinion 9 is mounted equiaxially on the rotatable blade 8. The pinion 9 can rotate with respect to the rotating movement of the moving element 9 through an engaging with a rack 10 which is provided along the base plate of the case 1. At the same time, a rotatable blade 8 which is equiaxially mounted with respect to the pinion 9 can rotate. A stationary blade 11 is mounted by interposing a spacer 12 on the bottom plate of the case 1 in such a way that it is in contact with the rotatable blade 8. The spacer 12 secures to leave a space between the stationary blade 11 and the case 1 and pass the paper therebetween.

In order to perform a cutting procedure with using this invented paper-cutter, after feeding the paper to be cut between the rotatable blade 8 and stationary blade 11 and the motor 4 is initiated to rotate, the male-screw bar 3 mounted inside the case 1 rotates through the gears 5. The moving element 6 having female-screw hole 7 which engages with the male-screw moves along the longitudinal direction inside the case being associated with the rotating movement of the male-screw. Since the rotatable blade 8 and pinion 9 are mounted equiaxially on the moving element 6 and the pinion 9 is constructed to engage with a rack 10 which is mounted on the base plate of the case 1, the rotatable blade 8 rotates with respect to the moving element 6 and the paper situated therebetween with the stationary blade 11 can be easily cut.

The screw mechanism and pinion/rack mechanism in this invention may be manufactured from synthetic resins, resulting in reductions of total weight of the paper-cutter and a production cost.

What is claimed is:

1. A paper cutter that includes:

an elongated enclosed housing that further includes a top wall, a bottom wall, a back wall, an open front and a pair of opposed end walls, a lead screw rotatably mounted in said end walls with one end of said lead screw passing through one end wall of the housing, said lead screw being positioned between said top wall and said bottom wall, a moving member mounted on said lead screw within the housing that is arranged to reciprocate laterally within the housing between said end walls, a stationary blade mounted in spaced-apart relationship with the bottom wall of the housing to define a paper path therebetween, said stationary blade having a linear cutting edge that extends outwardly beyond the open side of said housing along the bottom wall, a rack means mounted inside the housing along the bottom wall parallel to the cutting edge of the stationary blade, a rotatable blade mounted in the moving member by a shaft means that passes through the open side of said housing, said rotating blade being arranged to coact with the cutting edge of the stationary blade to cut a sheet of paper positioned between the blades, motor means fixedly mounted on said one end wall of said housing, said motor means being connected to said one end of the lead screw to turn said lead screw and move the carriage laterally within said housing, and pinion means mounted on said shaft means for connecting said rotatable blade to said rack means to coordinate the rotatable blade movement with the movement of the moving member to cut a sheet in said paper path between said blades.

2. The paper cutter of claim 1 wherein the lead screw is formed of a synthetic resin and is coaxially aligned with the central axis of the moving member.

3. The paper cutter of claim 2 wherein the lead screw is double threaded.

4. The paper cutter of claim 1 that further includes spacer means mounted between the stationary blade and the bottom wall of the housing to position the stationary blade a desired distance from said bottom wall.

5. The paper cutter of claim 1 wherein said one end wall of the housing extends rearwardly beyond the back wall and said motor means is mounted on the extended section adjacent to the back wall of the housing.

6. The paper cutter of claim 5 that further includes gear means for connecting the motor means to said one end of the lead screw.

* * * * *